United States Patent Office 3,001,936
Patented Sept. 26, 1961

3,001,936
PROCESS FOR THE CONTROL OF BACTERIA IN WATER FLOODING OPERATIONS
Edward O. Bennett, Houston, Tex., and Edward B. Hodge, Terre Haute, Ind., assignors to Commercial Solvents Corporation, New York, N.Y., a corporation of Maryland
No Drawing. Filed May 13, 1959, Ser. No. 812,819
8 Claims. (Cl. 252—8.55)

Our invention relates to the control of bacteria in water flooding operations used in the secondary recovery of petroleum oils, and more particularly, to controlling such organisms by incorporating into the flooding water effective amounts of a nitroalcohol having the following structural formula:

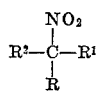

where R is a member selected from the group consisting of lower alkyl containing up to and including three carbon atoms, hydrogen and hydroxymethyl; $R^1$ is a member selected from the group consisting of hydroxymethyl and hydroxyethyl; and $R^2$ is a member selected from the group consisting of methyl and hydroxymethyl.

U.S. Patent 2,839,467 lists many of the problems found in the secondary oil recovery art and the means whereby some of these problems have been solved. The problem of controlling sulfate reducing bacteria is ever present and always difficult, as the growth of the microorganisms is not controlled by economically practicable amounts of many bactericides generally utilized in bacterial control and the organisms sometimes become resistant to generally used bactericides.

The problems attending the control of other microorganisms are more easily solved, but are nevertheless present. These organisms are generally controlled by moderate amounts of known bactericides.

We have now discovered that microorganisms are economically controlled at alkaline pH's by our above-described nitroalcohols. Compounds which we have found to be operative in our process include 2-nitro-2-methyl-1,3-propanediol, 2-nitro-3-butanol, 2-nitro-1,3-propanediol, 2-nitro-2-n-propyl-1,3-propanediol, 2-nitro-2-methyl-1-propanol, tris(hydroxymethyl)nitromethane, etc.

The usual procedure for the treatment of water to be utilized in flooding operations is to produce a concentrate of the bactericide in water and then continuously inject this concentrate into the water to be used in flooding operations at a rate which forms a desired dilution of the bactericide. This is done prior to pumping the water into the oil-bearing subterranean formation. Sampling and checking the water for bacteria will show whether the chemical concentration needs to be raised or may be lowered to effect an elimination of bacteria from the water.

Alternately, the bactericides utilized in our process may be added to the oil-bearing formations periodically, for example, once a week, as a high potency concentrate or the undiluted bactericide may be injected into the formation.

We have found that the compounds utilized in our process are active against some strains of bacteria in water at concentrations as low as about 2-5 p.p.m.

However, we prefer to utilize concentrations in excess of about 25-50 p.p.m. as we have found that even very resistant strains of Desulfovibrio desulfuricans are effectively controlled at these concentrations. It is to be understood, of course, that not all the compounds utilized in our process are effective to the same degree. The following table sets out the concentrations at which we have found representative nitroalcohols coming within the scope of the compounds utilized in our process to be completely effective against a resistant strain of Desulfovibrio desulfuricans in water flooding operations at alkaline pH's.

| Nitroalcohol: | Effective concentration, p.p.m. |
|---|---|
| 2-nitro-2-methyl-1,3-propanediol | 50 |
| 2-nitro-1,3-propanediol | 100 |
| 2-nitro-2-n-propyl-1,3-propanediol | 100 |
| 2-nitro-2-methyl-1-propanol | 100 |
| 2-nitro-2-ethyl-1,3-propanediol | 250 |
| Tris(hydroxymethyl)nitromethane | 100 |

The following examples set out the procedure used in testing our nitroalcohols for the control of sulfate reducing microorganisms. It is not intended that our invention be limited to the exact compositions or concentrations shown. Rather, it is intended that all equivalents obvious to those skilled in the art be included within the scope of our invention as claimed.

Example I

In a water treatment plant, a water concentrate containing 2-nitro-2-methyl-1,3-propanediol is continually added to water to be pumped into a alkaline subterranean oil-bearing formation at such a rate that a 50 p.p.m. solution of 2-nitro-2-methyl-1,3-propanediol is formed. The nitroalcohol treated flooding water is pumped into the oil-bearing formation which has an alkaline pH, and is completely effective in preventing bacterial plugging of the oil-bearing sands and the piping system utilized in the water flooding operations.

Example II

Utilizing the process of Example I, we have found that 100 p.p.m. of 2-nitro-1,3-propanediol is effective in controlling non-resistant sulfate reducing bacteria in water flooding operations.

This application is a continuation-in-part of our U.S. patent application Serial No. 765,029, filed October 3, 1958, now abandoned.

Now having described our invention, what we claim is:
1. In the process of secondary oil recovery characterized by the step of injecting flooding water into oil-bearing subterranean formations to displace portions of the oil therein, the improvement comprising having present in said injected flooding water in excess of about 2-5 p.p.m. of a nitroalcohol having the following structural formula:

where R is a member selected from the group consisting of lower alkyl containing up to and including three carbon atoms, hydrogen, and hydroxymethyl; $R^1$ is a member selected from the group consisting of hydroxymethyl and hydroxyethyl; and $R^2$ is a member selected from the group consisting of methyl and hydroxymethyl.

2. The process of claim 1 wherein the nitroalcohol is 2-nitro-2-methyl-1,3-propanediol.

3. The process of claim 1 wherein the nitroalcohol is 2-nitro-1,3-propanediol.

4. The process of claim 1 wherein the nitroalcohol is 2-nitro-2-n-propyl-1,3-propanediol.

5. The process of claim 1 wherein the nitroalcohol is 2-nitro-2-methyl-1-propanol.

6. The process of claim 1 wherein the nitroalcohol is 2-nitro-2-ethyl-1,3-propanediol.

7. The process of claim 1 wherein the nitroalcohol is tris(hydroxymethyl)nitromethane.

8. In a flooding process for the recovery of oil from oil-bearing subterranean formations, the improvement which comprises flooding the oil-bearing subterranean formations with an aqueous liquid containing in excess of about 25–50 p.p.m. of a nitroalcohol having the following structural formula:

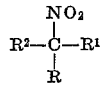

where R is a member selected from the group consisting of lower alkyl containing up to and including three carbon atoms, hydrogen and hydroxymethyl; $R^1$ is a member selected from the group consisting of hydroxymethyl and hydroxyethyl; and $R^2$ is a member selected from the group consisting of methyl and hydroxymethyl.

References Cited in the file of this patent

UNITED STATES PATENTS

| | | |
|---|---|---|
| 1,502,174 | Chapman | July 22, 1924 |
| 2,281,239 | Hass | Apr. 28, 1942 |
| 2,419,021 | Harnden | Apr. 15, 1947 |
| 2,692,231 | Stayner et al. | Oct. 19, 1954 |
| 2,839,467 | Hutchinson et al. | June 17, 1958 |
| 2,882,227 | Lindberg | Apr. 14, 1959 |

FOREIGN PATENTS

| | | |
|---|---|---|
| 107,419 | Australia | May 25, 1939 |
| 421,189 | Italy | Mar. 19, 1947 |